UNITED STATES PATENT OFFICE.

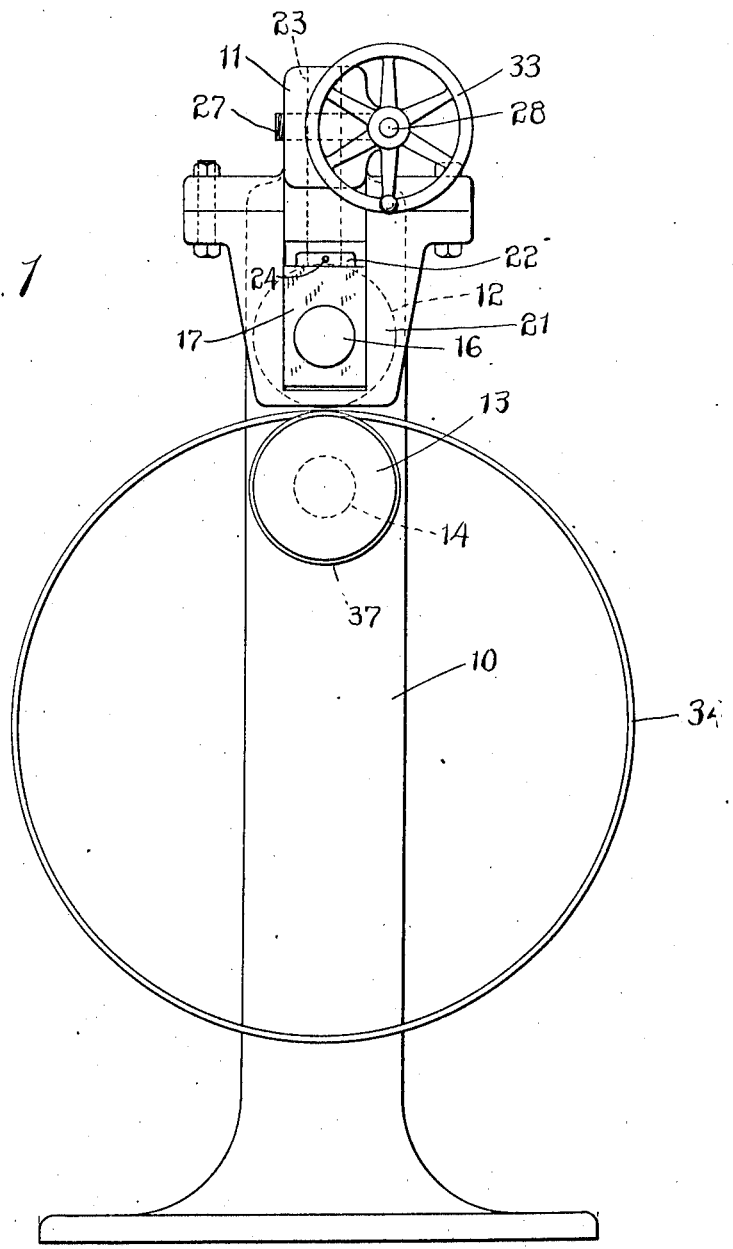

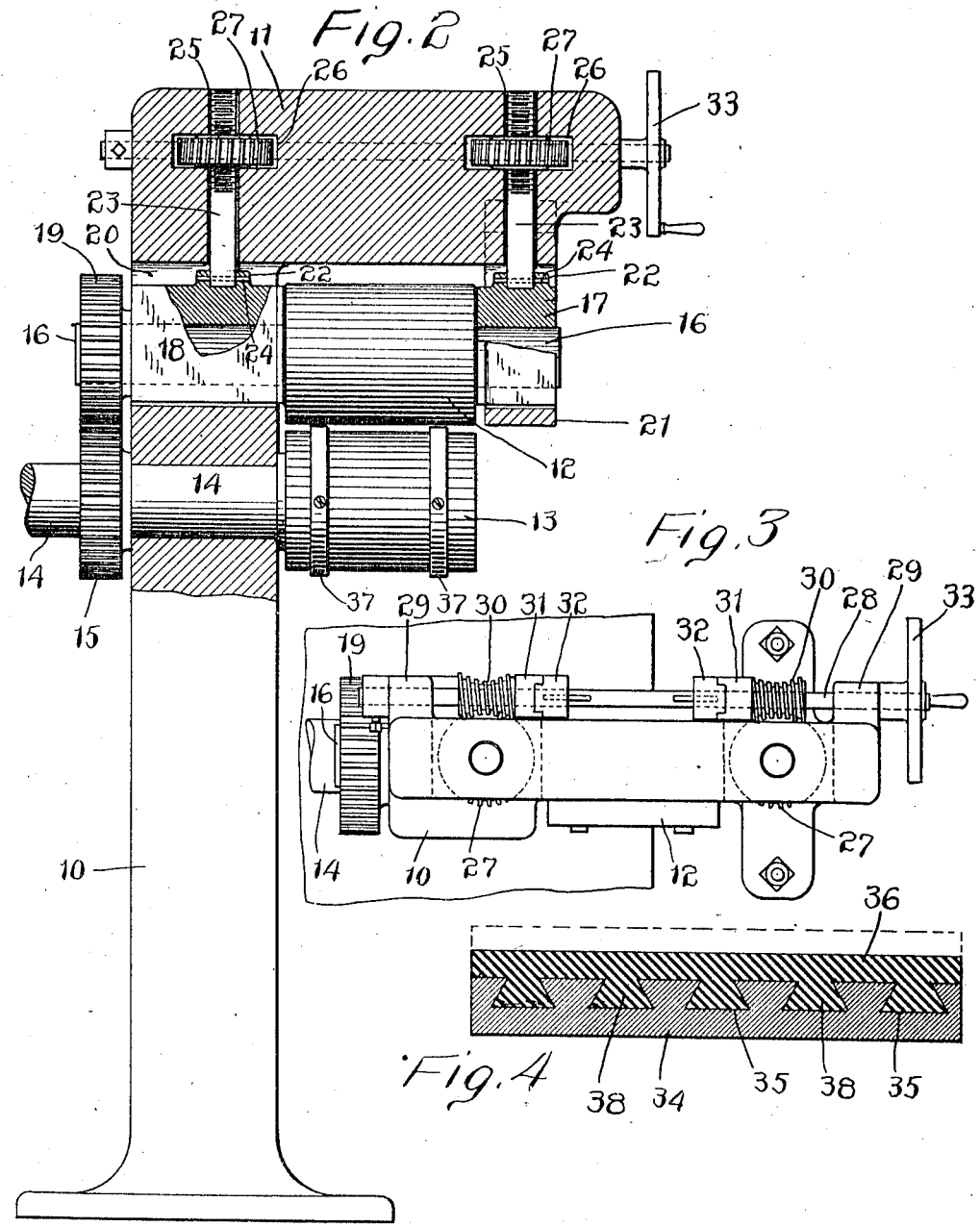

HUGO HENNIG, OF BRIDGEPORT, CONNECTICUT.

MACHINE FOR MAKING SOLID-RUBBER TIRES.

1,134,454.

Specification of Letters Patent.

Patented Apr. 6, 1915.

Application filed July 27, 1914. Serial No. 853,255.

*To all whom it may concern:*

Be it known that I, HUGO HENNIG, a subject of the Emperor of Germany, residing at Bridgeport, county of Fairfield, State of Connecticut, have invented an Improvement in Machines for Making Solid-Rubber Tires, of which the following is a specification.

This invention relates to the manufacture of solid rubber resilient tires for general use as upon heavy wagons and trucks and has for its object to provide a machine for rolling the relatively hard rubber foundation for a resilient tire into engagement with a metallic rim or base.

With this object in view I have devised the novel machine which I will now describe, referring to the accompanying drawings forming a part of this specification, and using reference characters to indicate the several parts:

Figure 1 is a front elevation of the machine as in use; Fig. 2 a side elevation as seen from the left in Fig. 1, partly in vertical section; Fig. 3 a plan view, and Fig. 4 is a transverse section on an enlarged scale of the steel base and hard rubber foundation for a solid rubber resilient tire.

10 denotes the standard, 11 a head which may be cast integral therewith, 12 the upper roll and 13 the lower roll which is carried by a shaft 14 journaled in the standard and carrying a gear wheel 15. Power is applied to drive shaft 14 in any ordinary or preferred manner, as by an electric motor, the motor and driving connections not being shown as they form no portion of the present invention. The upper roll is carried by a shaft 16 which is journaled in bearings 17 and 18 and carries a gear wheel 19 which meshes with gear wheel 15 on the driving shaft. Bearing 18 is seated in a recess 20 at the upper end of the standard and bearing 19 is seated in a housing 21 which is rigidly bolted to the head.

It is of course necessary that means should be provided for accurately adjusting the upper roll into parallelism with the lower roll and for raising and lowering it. This I accomplish in the manner I will now describe. The bearings are provided on their upper sides with bosses 22 which are provided with sockets to receive the ends of threaded rods 23. These rods are secured in the sockets in any suitable manner, as by means of pins 24, and extend upward through holes 25 in the head. The head is provided with transverse openings 26 which receive worm wheels 27 having threaded central holes with which the rods have threaded engagement.

28 denotes a shaft journaled in ears 29 upon the head and 30 worms formed integral with or rigidly secured to clutch members 31 and mounted on the shaft without engagement, leaving the shaft free to rotate independently, and have driving engagement with the worm wheels. 32 denotes other clutch members which are keyed to the shaft so as to be rotated thereby but have longitudinal movement on the shaft so that either clutch member 32 may be disconnected from the corresponding clutch member 31 when it is not desired to rotate the corresponding worm wheel in adjusting the upper roll. Shaft 28 is shown as provided with a hand wheel 33 for convenience in operation. Should it be required to raise or lower both ends of the upper roll simultaneously, both clutch members 32 are placed in engagement with the corresponding clutch members 31, so that rotation of the shaft will cause rotation of both worms and both worm wheels and will either raise or lower both ends of the shaft as may be required. Should it be required to raise or lower one end only of the upper roll, the clutch member 32 corresponding with the end of the roll that is to be adjusted is left in engagement with the corresponding clutch member 31 and the clutch member 32 corresponding with the end of the roll that is to remain stationary is moved out of engagement with the corresponding clutch member 31, so that rotation of the shaft, through the operation of the engaged worm with the corresponding worm wheel, will raise or lower one end only of the upper roll.

34 (see Fig. 4) denotes a metallic base or rim, ordinarily of steel, which is provided in its outer periphery with a plurality of undercut circumferential grooves 35, and 36 denotes a foundation for a resilient tire (not shown) which is made of relatively hard rubber and is rolled upon the base and into rigid engagement therewith while in a plastic condition. In use, the base or rim is simply hung upon the lower roll and is retained against lateral displacement thereon by adjustable collars 37 on the lower roll, which are shown as retained in place by set screws. The material to form the hard rubber foundation, ordinarily softened by heating, may be fed to the machine by hand or in any suitable manner, which forms no portion of the present invention. The base is rotated and the plastic material is rolled into the grooves therein forming dove tail ribs 38 which rigidly and permanently secure the foundation proper to the base. The foundation may of course be made of any required thickness within the capacity of the machine by raising or lowering the upper roll. The attachment of the resilient tire proper to the foundation forms no portion of the present invention and is performed by a separate machine, for which I contemplate making application for Letters Patent.

Having thus described my invention I claim:

1. A machine of the character described, comprising a standard, a lower roll adapted to receive thereon a tire base, spaced collars longitudinally adjustably mounted upon the lower roll and adapted to receive the tire base therebetween to prevent lateral movements thereof, an upper roll disposed above the lower roll, and gearing connecting the upper and lower rolls.

2. A machine of the character described, comprising a standard carrying a head at its upper end, a lower roll connected with the standard beneath the head, spaced collars longitudinally adjustably mounted upon the lower roll, vertically movable bearings arranged near the head, an upper roller disposed above the lower roller, a shaft carrying the upper roller and journaled through the vertically movable bearings, rods connected with the bearings and engaging the head, a shaft carried by the head, driving devices connecting the last named shaft with the rods, independently operated clutch members carried by the last-named shaft to render the devices active and inactive, and means to rotate the rolls.

3. A machine of the character described, comprising a standard carrying a head at its upper end, a lower roll, collars longitudinally adjustably mounted upon the lower roll, a shaft carrying the lower roll and supported by the standard, an upper roll, a shaft carrying the upper roll, gearing between the upper and lower shafts, vertically movable bearings receiving the upper shaft, upstanding rods connected with the bearings, worm wheels having screw-threaded engagement with the rods and engaging the head, a substantially horizontal shaft carried by the head and provided with worms engaging the worm wheels, independently operated clutches to lock and unlock the worms with and from the substantially horizontal shaft, and means to rotate the substantially horizontal shaft.

In testimony whereof I affix my signature in presence of two witnesses.

HUGO HENNIG.

Witnesses:
H. W. MEADE,
E. M. CULVER.